United States Patent
McGuffin

(10) Patent No.: US 9,812,019 B2
(45) Date of Patent: Nov. 7, 2017

(54) SYSTEMS AND METHODS FOR DETECTING IF A DATALINK APPLICATION IS AVAILABLE AT AN AIRPORT

(71) Applicant: Honeywell International Inc., Morristown, NJ (US)

(72) Inventor: Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/622,019

(22) Filed: Feb. 13, 2015

(65) Prior Publication Data

US 2016/0240088 A1    Aug. 18, 2016

(51) Int. Cl.
    G08G 5/00    (2006.01)
(52) U.S. Cl.
    CPC ......... *G08G 5/0013* (2013.01); *G08G 5/0021* (2013.01); *G08G 5/0043* (2013.01)
(58) Field of Classification Search
    CPC ........................... G08G 5/0013; G08G 5/0043
    USPC ........................................................ 701/120
    See application file for complete search history.

(56) References Cited

U.S. PATENT DOCUMENTS

| | | | |
|---|---|---|---|
| 6,167,239 A * | 12/2000 | Wright | H04B 7/18506 340/945 |
| 6,353,779 B1 | 3/2002 | Simon et al. | |
| 7,519,014 B2 * | 4/2009 | Allen | H04B 7/18508 370/310 |
| 7,848,877 B2 | 12/2010 | Goodman et al. | |
| 8,676,191 B2 | 3/2014 | Soumier et al. | |
| 2009/0040963 A1 * | 2/2009 | McGuffin | H04B 7/18506 370/325 |

(Continued)

FOREIGN PATENT DOCUMENTS

| | | |
|---|---|---|
| EP | 2023508 | 2/2009 |
| EP | 2267683 | 12/2010 |

(Continued)

OTHER PUBLICATIONS

European Patent Office, "Extended European Search Report from EP Application No. 16154583.5 dated Sep. 29, 2016", "from Foreign Counterpart of U.S. Appl. No. 14/622,019", Sep. 29, 2016, pp. 1-8, Published in: EP.

*Primary Examiner* — Yazan Soofi
(74) *Attorney, Agent, or Firm* — Fogg & Powers LLC

(57) ABSTRACT

Embodiments for detecting when a datalink application is available at an airport are disclosed. In one embodiment, an avionics computer installed onboard an aircraft comprises: a processing device; and a memory device communicatively coupled to the processing device and including instructions which, when executed by the processing device, cause the processing device to: send a request to a datalink applications database, wherein the request includes a query as to whether an airport is equipped with at least one datalink application; receive a response from the datalink applications database, wherein the response indicates whether the airport is equipped with the at least one datalink application; and send a message via datalink if the response indicates the airport is equipped with the at least one datalink application.

20 Claims, 5 Drawing Sheets

(56) References Cited

U.S. PATENT DOCUMENTS

| | | | | |
|---|---|---|---|---|
| 2009/0058682 A1* | 3/2009 | True | ............... | H04L 12/66 340/971 |
| 2009/0089693 A1* | 4/2009 | Fahy | ............... | G06F 17/243 715/764 |
| 2010/0241345 A1* | 9/2010 | Cornell | ............... | G08G 5/0013 701/120 |
| 2010/0332054 A1* | 12/2010 | Brandao | ............... | G08G 5/0013 701/3 |
| 2011/0133980 A1* | 6/2011 | Judd | ............... | G08G 5/0013 342/37 |
| 2015/0212671 A1* | 7/2015 | Judy | ............... | G06F 3/0483 715/776 |

FOREIGN PATENT DOCUMENTS

| | | |
|---|---|---|
| EP | 2337000 | 6/2011 |
| WO | 0230007 | 4/2002 |
| WO | 2007064734 | 6/2007 |

\* cited by examiner

SYSTEMS AND METHODS FOR DETECTING IF A DATALINK APPLICATION IS AVAILABLE AT AN AIRPORT

BACKGROUND

The Federal Aviation Administration (FAA) is transitioning some aspects of flight planning and routine communication with air traffic control (ATC) to rely less on voice communication and more on data communication. One application included in this next generation datalink communication system is that the FAA plans to begin delivering Departure Clearances (DCL) via datalink at major airports. The FAA's initial plans are to deploy DCL at fifty-seven major airports in the United States over the next several years. While the FAA plans to transition some aspects of flight planning and routine communication via datalink at all major United States airports eventually, the transition will take a number of years to complete since only a few major airports will be upgraded each year. Similar transitions are likely to occur, and have been occurring, for other aviation administrations, as well. Due to these changes, an ATC can spend more time controlling traffic rather than giving voice instructions to a pilot for DCL. Moreover, transcription errors can be reduced due to this implementation.

For the reasons stated above and for reasons stated below which will become apparent to those skilled in the art upon reading and understanding the specification, there is a need in the art for improved systems and methods for detecting if a datalink application is available at an airport.

SUMMARY

The embodiments of the present invention provide systems and methods for detecting when a datalink application is available at an airport. In one embodiment, an avionics computer is installed onboard an aircraft. The avionics computer comprises: a processing device; and a memory device communicatively coupled to the processing device and including instructions which, when executed by the processing device, cause the processing device to: send a request to a datalink applications database, wherein the request includes a query as to whether an airport is equipped with at least one datalink application; receive a response from the datalink applications database, wherein the response indicates whether the airport is equipped with the at least one datalink application; and send a message via datalink if the response indicates the airport is equipped with the at least one datalink application.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
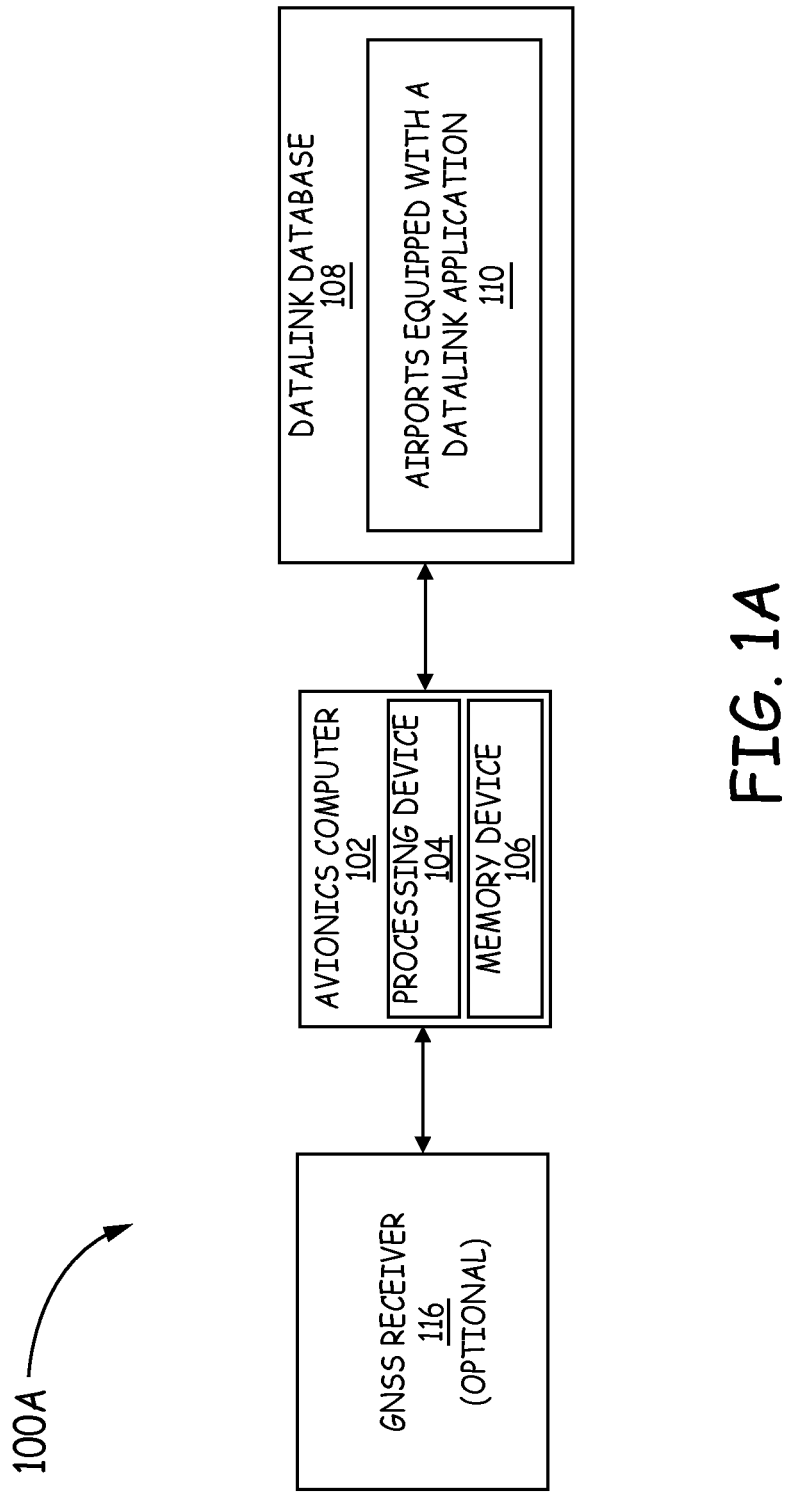
FIGS. 1A-1D are block diagrams of example systems that alert a flight crew as to whether an airport is equipped with a datalink application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed.

In conventional implementations, to determine whether an airport is equipped with a datalink application, a pilot may use voice communication to request the pertinent information. Or, in some instances, a pilot may use paper charts or an electronic version of the charts included in the Electronic Flight Bag (EFB) to make the determination. This information, however, can be outdated. Moreover, these conventional implementations require extra time on behalf of the flight crews to look up the pertinent information, which result in added costs for the airline. Due to the embodiments described herein, the extra time and added costs can be reduced because the flight crew will be alerted as to whether an airport is equipped with a datalink application, as described in detail below.

FIGS. 1A-1D are block diagrams of example systems 100A-100D that alert a flight crew as to whether an airport is equipped with a datalink application. Reference numbers that are the same in each respective FIG. 1A-1D perform similar functions, unless otherwise stated.

The systems 100A-100D include an avionics computer 102 located onboard an aircraft and a datalink applications database 108. Generally, the systems 100A-100D function as follows. The avionics computer 102 includes a processing device 104 and a memory device 106 communicatively coupled to the processing device 104 and including instructions which, when executed by the processing device 104, cause the processing device 104 to: send a request to the datalink applications database 108 to determine whether an airport is equipped with at least one datalink application. In some embodiments, the request can be specific request as to whether an airport is equipped with a specific type of datalink application. In other embodiments, the request can be a general request as to whether an airport is equipped with a datalink application, without regard to the specific type of datalink application.

After the request is sent, the datalink applications database 108 will determine whether the airport is equipped with at least one datalink application by querying a list of airports that are equipped with a datalink application 110, wherein the list of airports 110 is stored on the datalink applications database 108. If the airport is equipped with a datalink application, a reply message to that effect will be sent back to the avionics computer 102 and the processing device can be configured to send its message, for the respective datalink application, via datalink. If the airport is not equipped with a datalink application, then a reply message indicating the airport is not equipped with a datalink application will be sent to the avionics computer 102; and, the flight crew will know to use voice communication to carry out their request. As a result, the flight crew can save time by not having to manually look up whether an airport is equipped with the datalink application.

As an example, assume an aircraft is flying into Chicago O'Hare International Airport (ORD). In some embodiments, when the aircraft lands (or during other times as discussed below), the processing device 104 included in the avionics computer 102 is configured to send a message to a datalink applications database 108 to determine whether ORD is equipped with a datalink application. The datalink applications database 108 will query its stored list of airports 110 to determine whether ORD is included in the list. If ORD is not, then a message would be sent back to the avionics computer 102 saying that the ORD does not support the datalink application. The pilot would then know to make any request using voice communication. If, however, ORD did support the datalink application, then the pilot could make some specific requests using a datalink connection, as discussed below.

The avionics computer 102 is installed onboard an aircraft; and, in general, the avionics computer 102 will want to determine whether the airport that the aircraft is landing at and taking off from is equipped with a datalink application. In some embodiments, to make this determination, the avionics computer 102 can be communicatively coupled to a Global Navigation Satellite System (GNSS) receiver 116, as shown in FIG. 1A.

In some other embodiments, a flight crew may want to know if an airport other than the one the aircraft is located at is equipped with a datalink application. In these embodiments, the flight crew can select an airport among a list of airports on the avionics computer 102. After which, the processing device 104 will send a message to the datalink applications database 108 and the datalink applications database 108 will make a determination and send an appropriate response as to whether the airport has been updated with a datalink application.

Figure 1B:
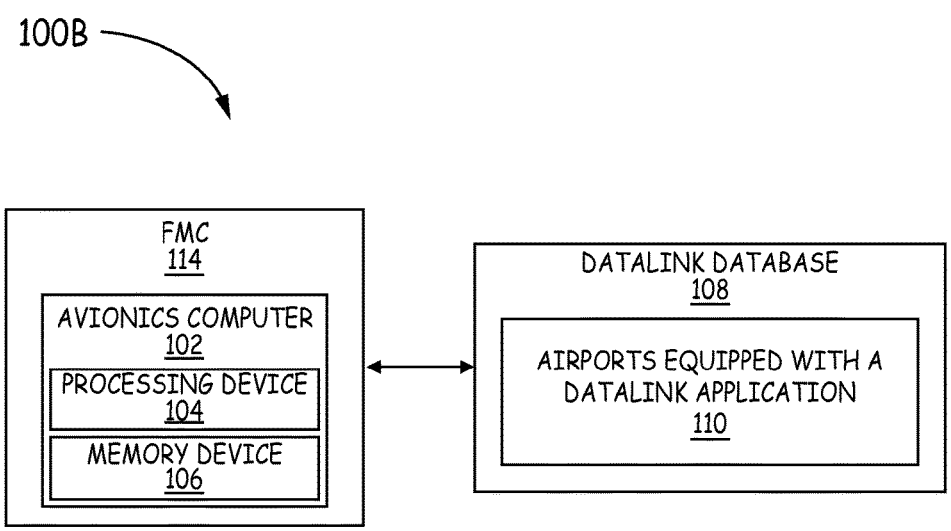

In some embodiments, the avionics computer 102 can be communicatively coupled to the aircraft's Flight Management Computer (FMC). In some of these embodiments, the avionics computer 102 can be incorporated into the FMC 114 of the aircraft, as shown in FIG. 1B. In embodiments where the avionics computer 102 is incorporated into the FMC 114, the FMC 114 is the avionics computer 102 sending the request and receiving the response. In these embodiments, the ARINC 702 protocol can be used as a communication protocol. As a result of the avionics computer 102 being communicatively coupled to the FMC 114 or incorporated into the FMC 114, the avionics computer 102 can use the FMC's 114 flight path information to determine the location of the aircraft. In even other embodiments, the avionics computer 102 can use both information from the FMC 114 and the GNSS receiver 116 to determine the location of the aircraft. As a result of these embodiments, the avionics computer 102 can know which airport the aircraft is landing at and taking off from and request whether that airport is equipped with a datalink application.

Figure 1C:
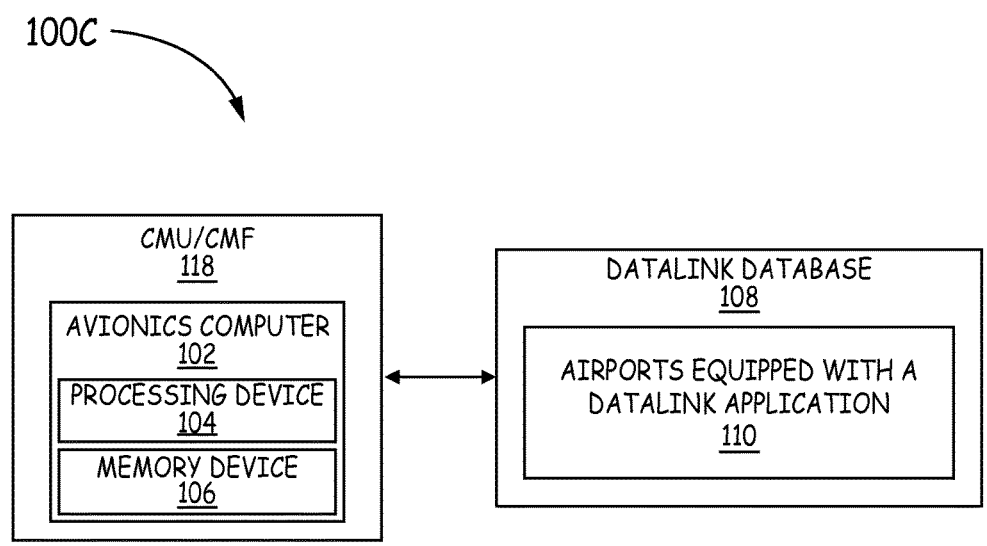

In some embodiments, the avionics computer 102 can be communicatively coupled to the Communications Management Unit (CMU/CMF)/Communication Management Function (CMF) 118 of the aircraft. The CMU/CMF 118 of the aircraft will be referred to herein as the CMU 118. In some other embodiments, the avionics computer 102 can be incorporated into the CMU 118 of the aircraft, as shown in FIG. 1C. In embodiments where the avionics computer 102 is incorporated into the CMU 118, the CMU 118 is the avionics computer 102 sending the request and receiving the response. In embodiments where the avionics computer 102 is communicatively coupled to the CMU 118 or incorporated into the CMU 118, the avionics computer's 102 request can be sent via the CMU 118, using the datalink network that is available at the location of the aircraft. For example, in some embodiments, High Frequency (HF) datalink, Very High Frequency (VHF) datalink or satellite communication can be used. In these embodiments, the Aircraft Communications Addressing and Reporting System (ACARS) can be used to deliver the message to the datalink applications database 108, with an example protocol being the Aeronautical Radio (ARINC) 618. In other embodiments, a Wi-Fi network, cellular supported text messaging or other service can be used. These are only examples, though, and not meant to be limiting.

As described above, the list of airports equipped with a datalink application 110 will change from year-to-year for a few years to come. As a result, the list of airports 110 will need to be maintained, which can be done by various entities. In some embodiments, the list of airports 110 can be maintained by the FAA. In other embodiments, the list of airports 110 can be maintained by the airline for the aircraft. In even other embodiments, the list of airports 110 can be maintained by a third-party, such as the Honeywell Global Data Center (GDC). However, these are only examples and not meant to be limiting.

Figure 1D:
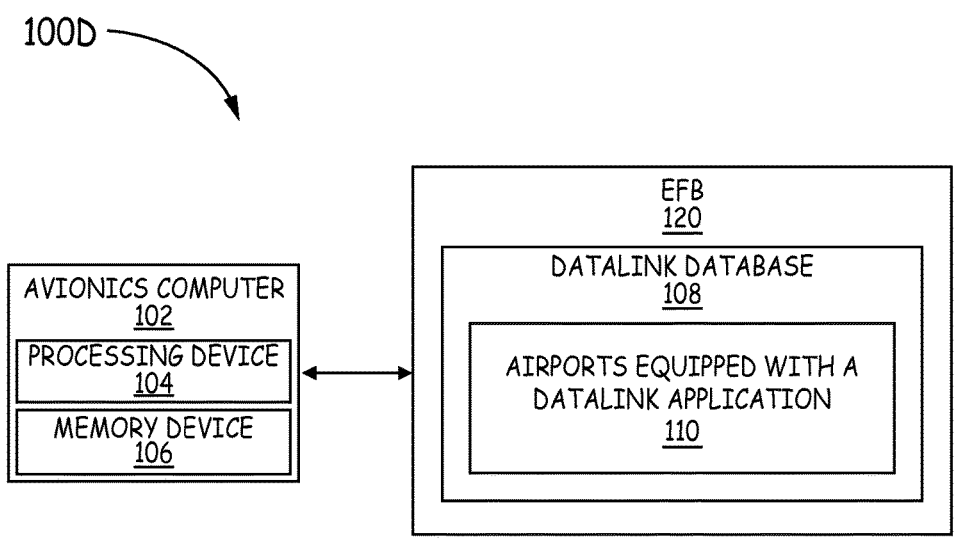

In some embodiments, the datalink applications database 108 is located onboard the aircraft. In some of these embodiments, the datalink applications database 108 can be included in the Electronic Flight Bag (EFB) 120 of the aircraft, as shown in FIG. 1D. In these embodiments, an EFB 120 can be modified to recognize and respond to the request from a CMU 118 or a FMC 114 as to whether an airport is included in the list of airports 110 that are equipped with a datalink application. If the message is initiated by the crew via the FMC's 114 Human Machine Interface (HMI) then the FMC 114 may generate a downlink message, regardless of whether the datalink applications database 108 is located onboard the aircraft or on the ground. However, in embodiments where the datalink applications database 108 is included in the EFB 120, the CMU 118 can have a priori knowledge of the datalink applications database 108 location in the EFB 120. Thus, instead of downlinking the request from the FMC 114, the CMU 118 could redirect the request message to the EFB 120 and, if needed, convert the message format into a form that the EFB 120 would understand. The EFB 120 could respond with the requested information regarding whether the airport identified in the request is included in the list of airports 110 equipped with the datalink application and/or the airport identified in the request can communicate DCL via datalink. The CMU 118 could forward the EFB 120 response to the FMC 114 and, if needed, convert the EFB 120 response message into a format understood by the FMC 114, such as the format specified ARINC 702.

In other embodiments, the datalink applications database 108 can be located onboard the aircraft but separate from the EFB 120. Some examples of communication links that can be used by the avionics computer 102 to make the request of, and received the response from, the datalink applications database 108 under these embodiments include, but are not limited to, an avionics bus connection, such as the ARINC 429 protocol, Ethernet, Wi-Fi, etc. In some embodiments where the datalink application are not supported at the specific airport, a text message could be uplinked to the avionics computer 102. In other embodiments, the flight crew could be trained to assume that the lack of an uplink means the datalink application are not available.

As mentioned above, the request by the avionics computer 102 can be made at different times. For example, in some embodiments, the request to the datalink applications database 108 can be automatically sent when an aircraft lands (referred to herein as "on report"). In other embodiments, the request can be automatically sent when the aircraft parks at its gate (referred to herein as "in report"). During these times, the CMU 118 of the aircraft automatically sends various other messages to ground control, such as an airport identifier along with other data such as the current time. In some embodiments, the request sent by the avionics computer 102 in this disclosure can be sent as part of one of those other messages or as a separate message. In some embodiments, the request can be sent manually at other times. For example, a flight crew may choose to send the request before the first flight of the day for an aircraft.

As stated above, while the system 100 works for the general inquiry of whether an airport is equipped with a datalink application, in some embodiments, the request may also be specific. For example, in some embodiments, the request by the avionics computer 102 can be a request as to whether an airport can deliver at least one of the following applications via datalink: departure clearance (DCL) information D-TAXI information, Future Air Navigation System (FANS) information, Flight Information Service (FIS) information, Controller Pilot Data Link Communication (CPDLC).

DCL information can include, but is not limited to: instructions regarding which runway to use, directions to the runway and what path to take through the taxi ways, time of departure, and flying instructions once the aircraft leaves the runway, such as which way to fly, whether to turn, altitude ascension, etc. For requests as to whether an airport supports DCL via datalink, in some embodiments, an address that pertains to where the avionics computer 102 is supposed to make the DCL request can be sent by the datalink applications database 104 along with whether the airport can dispatch DCL via datalink. Moreover, if the aircraft is equipped with a newer FMC 114, the CMU 118 can direct the address to the FMC 114 for automatic input. In some of these embodiments, some reformatting may be required in order to automatically import the address into the FMC 114. For aircrafts that utilize an older FMC 114, the flight crew may be required to type the address into the FMC 114. In addition, in some embodiments, Automatic Terminal Information Services (ATIS), the version that a pilot is using, and Stand information can be communicated along with the DCL information. In other embodiments, the request by the avionics computer 102 may be specific as to whether an airport can communicate ATIS via datalink, exclusive of DCL. As another example, in some embodiments, the request can be whether landing instructions can be delivered via datalink.

Figure 2:
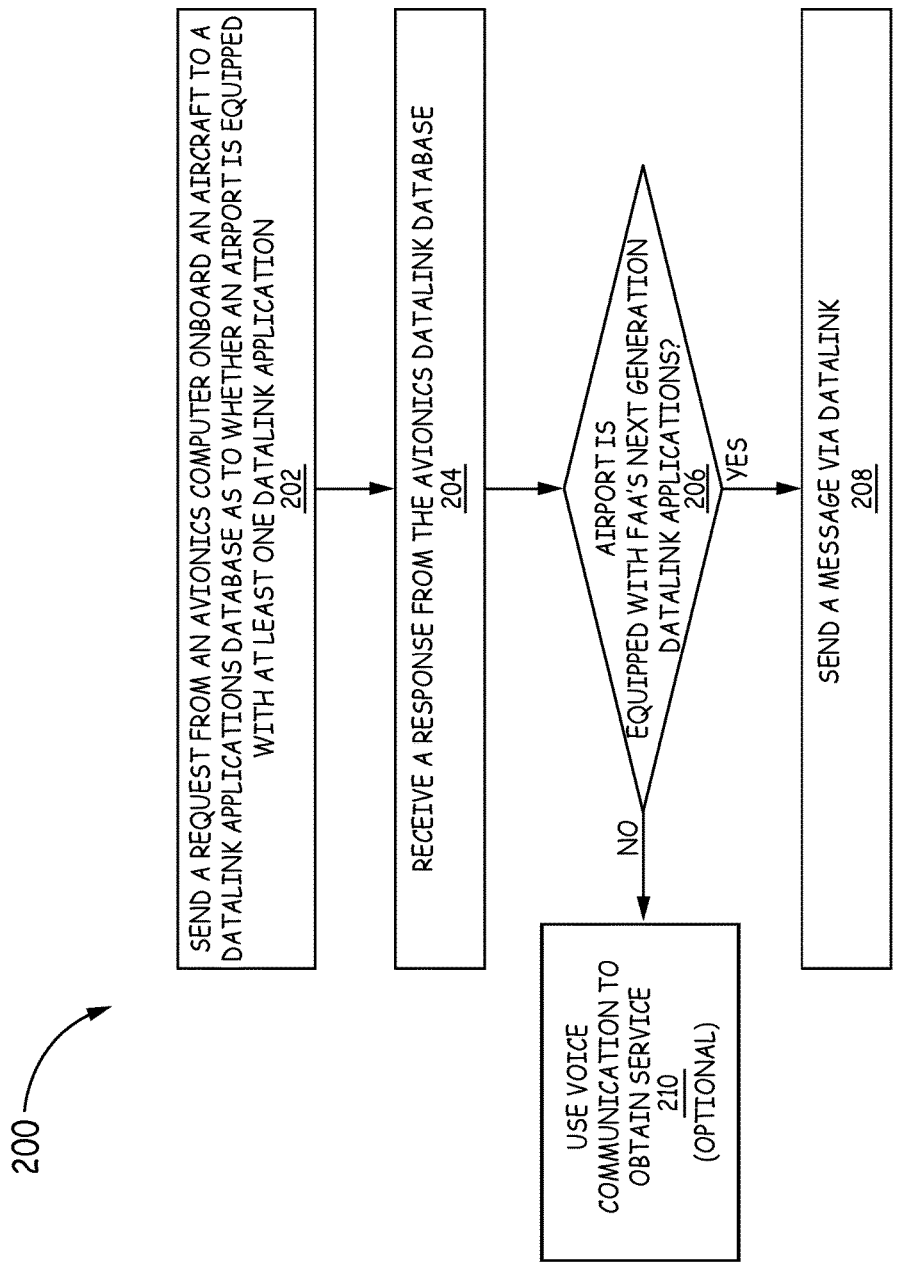
FIG. 2 is a flow diagram of a method for determining whether an airport is equipped with a datalink application.

FIG. 2 is a flow diagram of a method 200 for determining whether an airport is equipped with a datalink application. The method 200 comprises sending a request from an avionics computer onboard an aircraft to a datalink applications database as to whether an airport is equipped with at least one datalink application (block 202). In some embodiments, the request can be specific request as to whether an airport is equipped with a specific type of datalink application. In other embodiments, the request can be a general request as to whether an airport is equipped with a datalink application, without regard to the specific type of datalink application. The request can be made using an avionics computer, which in some embodiments, can have some or all of the same functionality as the avionics computer 102 discussed above. In some embodiments, the request can be sent automatically when an aircraft lands at an airport. Furthermore, in some embodiments, the request can be made when an aircraft parks in its gate at the airport. Moreover, in some embodiments, the request can be initiated manually by a flight crew member. Similar to above, in some embodiments, the avionics computer making the request can be communicatively coupled to, or incorporated into, to the aircrafts FMC or CMU. Furthermore, in some embodiments, the avionics computer making the request can be communicatively coupled to a GNSS receiver.

In some embodiments, the datalink applications database can have some or all of the same functionality as the datalink applications database 108 discussed above. That is, the datalink applications database can have a list of the airports that are equipped with a datalink application. The datalink applications database can then perform a query as to whether a specific airport is included in that list when requested to do so. Moreover, in some embodiments, the datalink applications database can be onboard the aircraft. In some of these embodiments, the datalink applications database can be incorporated into the aircraft's electronic flight bag. In other embodiments, the datalink applications database can be located external to the aircraft. Furthermore, similar to above, different entities can maintain the datalink applications database, such as an airline, the FAA, or a third-party.

As stated above, in some embodiments, the request can be as to whether an airport is equipped with a specific datalink application. For example, in some embodiments, the request can be a request as to whether an airport can deliver at least one of the following applications via datalink: departure clearance (DCL) information D-TAXI information, Future Air Navigation System (FANS) information, Flight Information Service (FIS) information, Controller Pilot Data Link Communication (CPDLC).

The method 200 further comprises receiving a response from the datalink applications database as to whether the airport is equipped with the at least one datalink application (block 204). In the embodiments where the request is specific as to whether DCL information can be delivered via datalink, an address can be included in the response that the DCL request should be made to.

In some embodiments, the type of connection used to make the request can be any of the types described above in FIG. 1. For example, in some embodiments where the datalink applications database is external to the aircraft, an HF datalink, a VHF datalink, or satellite communication can be used. In some other embodiments where the datalink applications database is onboard the aircraft, an avionics bus connection, Ethernet, Wi-Fi, et al. can be used.

If the response received from the datalink applications database indicates that the airport is equipped with the datalink application, then block 206 can direct the method 200 to block 208 and a message can be sent via datalink. In some embodiments, however, if the response received from the datalink applications database indicates that the airport is not equipped with the FAA's next generation datalink application, then block 206 can direct the method 200 to block 210 and voice communication can be used to obtain service.

The memory used in the present systems and methods can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

A processing device used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device can also include functions with software programs, firmware, or other computer readable instructions for carrying out various process tasks, calculations, and control functions used in the present method and system.

One or more acts described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

EXAMPLE EMBODIMENTS

Example 1 includes an avionics computer installed onboard an aircraft, the avionics computer comprising: a processing device; and a memory device communicatively coupled to the processing device and including instructions which, when executed by the processing device, cause the processing device to: send a request to a datalink applications database, wherein the request includes a query as to whether an airport is equipped with at least one datalink application; receive a response from the datalink applications database, wherein the response indicates whether the airport is equipped with the at least one datalink application; and send a message via datalink if the response indicates the airport is equipped with the at least one datalink application.

Example 2 includes the avionics computer of Example 1, wherein the datalink applications database is external to the aircraft.

Example 3 includes the avionics computer of any of Examples 1-2, wherein the datalink applications database is stored in the aircraft's electronic flight bag.

Example 4 includes the avionics computer of any of Examples 1-3, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein if the at least one application includes DCL information, the response includes an address where the DCL request is to be sent.

Example 5 includes the avionics computer of any of Examples 1-4, wherein the avionics computer is incorporated into the flight management computer (FMC) of the aircraft or the Communications Management Unit (CMU) of the aircraft.

Example 6 includes the avionics computer of any of Examples 1-5, wherein the processing device is configured to automatically send the request when the aircraft lands at the airport.

Example 7 includes the avionics computer of any of Examples 1-6, wherein the processing device is configured to automatically send the request when the aircraft parks in the gate at the airport.

Example 8 includes the avionics computer of any of Examples 1-7, wherein the processing device is configured to send the request when a flight crew member directs the avionics computer to do so.

Example 9 includes a method for determining whether an airport is equipped with at least one datalink application, the method comprising: sending a request from an avionics computer onboard an aircraft to a datalink applications database as to whether an airport is equipped with at least one datalink application; receiving a response from the datalink applications database as to whether the airport is equipped with the at least one datalink application; and sending a message via datalink if the response indicates the airport is equipped with the at least one datalink application.

Example 10 includes the method of Example 9, wherein the datalink applications database is external to the aircraft.

Example 11 includes the method of any of Examples 9-10, wherein the datalink applications database is stored in the aircraft's electronic flight bag.

Example 12 includes the method of any of Examples 9-11, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein if the at least one application includes DCL information, the response includes an address where the DCL request is to be sent.

Example 13 includes the method of any of Examples 9-12, wherein sending the request to the datalink applications database is automatically performed when the aircraft lands at the airport.

Example 14 includes the method of any of Examples 9-13, wherein sending the request to the datalink applications database is automatically performed when the aircraft parks in its gate at the airport.

Example 15 includes the method of any of Examples 9-14, wherein sending the request to the datalink applications database is initiated by a flight crew member.

Example 16 includes an avionics system comprising: a datalink applications database, wherein the datalink applications database has a list of airports that are equipped with at least one datalink application; an avionics computer installed onboard an aircraft and configured to send a request to the datalink applications database and receive a response from the datalink applications database, wherein the request includes a query as to whether an airport is equipped with at least one datalink application; and wherein the response indicates whether the airport is equipped with the at least one datalink application.

Example 17 includes the avionics system of Example 16, wherein the datalink applications database is external to the aircraft.

Example 18 includes the avionics system of any of Examples 16-17, wherein the datalink applications database is stored in the aircraft's electronic flight bag.

Example 19 includes the avionics system of any of Examples 16-18, wherein the avionics computer is incorporated into the flight management computer (FMC) of the aircraft or the Communications Management Unit (CMU) of the aircraft.

Example 20 includes the avionics system of any of Examples 16-19, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein if the at least one application includes DCL information, the response includes an address where the DCL request is to be sent.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics computer installed onboard an aircraft, the avionics computer comprising:
   a processing device; and
   a memory device communicatively coupled to the processing device and including instructions which, when executed by the processing device, cause the processing device to:
      send a request to a datalink applications database, wherein the request includes a query as to whether an airport is equipped with at least one datalink application that can be communicated via datalink;
      receive a response from the datalink applications database, wherein the response indicates whether the airport is equipped with the at least one datalink application; and
      when the response indicates the airport is equipped with the at least one datalink application, send a message via datalink requesting the at least one datalink application that the airport is equipped with.

2. The avionics computer of claim 1, wherein the datalink applications database is external to the aircraft.

3. The avionics computer of claim 1, wherein the datalink applications database is stored in the aircraft's electronic flight bag.

4. The avionics computer of claim 1, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein when the at least one application includes DCL information, the response includes an address where the DCL request is to be sent.

5. The avionics computer of claim 1, wherein the avionics computer is incorporated into the flight management computer (FMC) of the aircraft or the Communications Management Unit (CMU) of the aircraft.

6. The avionics computer of claim 1, wherein the processing device is configured to automatically send the request when the aircraft lands at the airport.

7. The avionics computer of claim 1, wherein the processing device is configured to automatically send the request when the aircraft parks in the gate at the airport.

8. The avionics computer of claim 1, wherein the processing device is configured to send the request when a flight crew member directs the avionics computer to do so.

9. A method for determining whether an airport is equipped with at least one datalink application, the method comprising:
   sending a request from an avionics computer onboard an aircraft to a datalink applications database as to whether an airport is equipped with at least one datalink application that can be communicated via datalink;
   receiving a response from the datalink applications database as to whether the airport is equipped with the at least one datalink application;
   when the response indicates the airport is equipped with the at least one datalink application, sending a message via datalink requesting the at least one datalink application that the airport is equipped with.

10. The method of claim 9, wherein the datalink applications database is external to the aircraft.

11. The method of claim 9, wherein the datalink applications database is stored in the aircraft's electronic flight bag.

12. The method of claim 9, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein when the at least one application includes DCL information, the response includes an address where the DCL request is to be sent.

13. The method of claim 9, wherein sending the request to the datalink applications database is automatically performed when the aircraft lands at the airport.

14. The method of claim 9, wherein sending the request to the datalink applications database is automatically performed when the aircraft parks in its gate at the airport.

15. The method of claim 9, wherein sending the request to the datalink applications database is initiated by a flight crew member.

16. An avionics system comprising:
   a datalink applications database, wherein the datalink applications database has a list of airports that are equipped with at least one datalink application;
   an avionics computer installed onboard an aircraft and configured to send a request to the datalink applications database and receive a response from the datalink applications database,
      wherein the request includes a query as to whether an airport is equipped with at least one datalink application that can be communicated via datalink; and
      wherein the response indicates whether the airport is equipped with the at least one datalink application; and
   wherein when the response indicates the airport is equipped with the at least one datalink application, send a request for the datalink application via datalink.

17. The avionics system of claim 16, wherein the datalink applications database is external to the aircraft.

18. The avionics system of claim 16, wherein the datalink applications database is stored in the aircraft's electronic flight bag.

19. The avionics system of claim 16, wherein the avionics computer is incorporated into the flight management computer (FMC) of the aircraft or the Communications Management Unit (CMU) of the aircraft.

20. The avionics system of claim 16, wherein the at least one datalink application includes at least one of the following: departure clearance (DCL) information, D-TAXI information, Future Air Navigation System (FANS) information, Flight Information Service (FIS) information, Controller Pilot Data Link Communication (CPDLC); and wherein when the at least one application includes DCL information, the response includes an address where the DCL request is to be sent.

\* \* \* \* \*